(12) United States Patent
Cerrato (10) Patent No.: US 8,046,787 B2
(45) Date of Patent: Oct. 25, 2011

(54) METHOD AND SYSTEM FOR THE STORAGE, VIEWING MANAGEMENT, AND DELIVERY OF TARGETED ADVERTISING

(75) Inventor: Dean E. Cerrato, Boston, MA (US)

(73) Assignee: OpenTV, Inc., San Francisco, CA (US)

( * ) Notice: Subject to any disclaimer, the term of this patent is extended or adjusted under 35 U.S.C. 154(b) by 541 days.

(21) Appl. No.: 10/448,157

(22) Filed: May 29, 2003

(65) Prior Publication Data

US 2004/0025174 A1 Feb. 5, 2004

Related U.S. Application Data

(60) Provisional application No. 60/385,239, filed on May 31, 2002.

(51) Int. Cl.
H04N 7/16 (2011.01)
(52) U.S. Cl. .................. 725/9; 725/5; 725/8; 725/22
(58) Field of Classification Search ............. 725/32–36, 725/14, 44, 45, 46, 61, 97, 105; 705/10, 705/14, 14.4, 14.25, 14.7
See application file for complete search history.

(56) References Cited

U.S. PATENT DOCUMENTS

| | | | | |
|---|---|---|---|---|
| 5,623,404 A | 4/1997 | Collins et al. | ................. | 395/209 |
| 5,742,521 A | 4/1998 | Ellenby et al. | ................. | 364/550 |
| 5,801,747 A | 9/1998 | Bedard | .............................. | 348/1 |
| 5,926,800 A | 7/1999 | Baronowski et al. | ........... | 705/35 |
| 5,973,683 A | 10/1999 | Cragun et al. | ................. | 345/327 |
| 5,974,398 A | 10/1999 | Hanson et al. | .................. | 705/14 |
| 6,005,597 A | 12/1999 | Barrett et al. | ..................... | 348/1 |
| 6,057,872 A * | 5/2000 | Candelore | ........................ | 725/23 |
| 6,088,722 A | 7/2000 | Herz et al. | ..................... | 709/217 |
| 6,119,098 A | 9/2000 | Guyot et al. | ..................... | 705/14 |
| 6,144,944 A | 11/2000 | Kurtzman, II et al. | .......... | 705/14 |
| 6,201,536 B1 | 3/2001 | Hendricks et al. | ............. | 345/327 |
| 6,286,012 B1 | 9/2001 | Kindo et al. | ................. | 707/104 |
| 6,317,883 B2 | 11/2001 | Marics | ............................. | 725/56 |
| 6,351,596 B1 | 2/2002 | Ostrover | ........................ | 388/46 |
| 6,438,752 B1 | 8/2002 | McClard | ......................... | 725/46 |
| 6,460,036 B1 | 10/2002 | Herz | ............................... | 707/10 |
| 6,463,585 B1 | 10/2002 | Hendricks et al. | .............. | 725/35 |
| 6,477,509 B1 | 11/2002 | Hammons et al. | .............. | 705/27 |
| 6,487,538 B1 | 11/2002 | Gupta et al. | ..................... | 705/14 |
| 6,567,854 B1 | 5/2003 | Olshansky et al. | ........... | 709/229 |
| 6,571,279 B1 | 5/2003 | Herz et al. | ..................... | 709/217 |
| 2002/0059094 A1 | 5/2002 | Nosea et al. | .................... | 705/10 |
| 2002/0120927 A1 * | 8/2002 | Harada et al. | ................... | 725/23 |
| 2002/0129368 A1 * | 9/2002 | Schlack et al. | .................. | 725/46 |
| 2002/0138831 A1 * | 9/2002 | Wachtfogel et al. | ............ | 725/32 |

(Continued)

OTHER PUBLICATIONS

Australian Application No. 2003245349 Examiner's First Report mailed Jul. 18, 2006, 3 pgs.
Australian Application No. 2003245349 Response to First Office Action filed Jun. 13, 2007, 9 pgs.
Australian Application No. 2003245349 Second Office Action mailed Jun. 27, 2007, 2 pgs.

(Continued)

*Primary Examiner* — Scott Beliveau
*Assistant Examiner* — Alan Luong
(74) *Attorney, Agent, or Firm* — Schwegman, Lundberg & Woessner, P.A.

(57) ABSTRACT

A method for managing television advertisements. The method includes determining if a subscriber has reached a minimum level of advertisement viewing and curtailing the service level of the subscriber if the subscriber does not maintain the minimum level of advertisement viewing.

23 Claims, 2 Drawing Sheets

U.S. PATENT DOCUMENTS

| | | | |
|---|---|---|---|
| 2002/0147645 A1* | 10/2002 | Alao et al. | 705/14 |
| 2002/0162115 A1 | 10/2002 | Bruckner et al. | 725/105 |
| 2003/0097657 A1* | 5/2003 | Zhou et al. | 725/46 |
| 2003/0172376 A1* | 9/2003 | Coffin, III | 725/22 |
| 2004/0078809 A1* | 4/2004 | Drazin | 725/34 |
| 2005/0021403 A1 | 1/2005 | Ozer et al. | |
| 2011/0161997 A1* | 6/2011 | Rourk | 725/5 |

OTHER PUBLICATIONS

European Application No. 03738988 Supplemental Search Report, 2 pgs.

International Search Report mailed Feb. 23, 2004 in corresponding PCT Application No. PCT/US03/16845, 2 pgs.

* cited by examiner

METHOD AND SYSTEM FOR THE STORAGE, VIEWING MANAGEMENT, AND DELIVERY OF TARGETED ADVERTISING

The present application claims priority to Provisional Application Ser. No. 60/385,239 filed on May 31, 2002, and entitled "Method and System for the Storage, Viewing Management, and Delivery of Targeted Advertising," which is expressly incorporated herein by reference.

FIELD

The present invention relates generally to methods and systems for managing advertisement viewing for television systems.

BACKGROUND

As the use of personal video recorders (PVRs) enables television viewers to time-shift their viewing behavior, advertisers can be less and less certain that their spots are reaching their intended audience, since the natural inclination for most people is to skip over commercials when viewing recorded programs. As viewers become more and more accustomed to commercial-free viewing, the tendency not to watch commercials will be reinforced. Instead, viewers surf between different channels when advertisements are displayed on a channel being viewed or use PVRs to record programs so that commercials can be skipped.

Viewers don't dislike commercials per se as much as they dislike having commercials foisted upon them. Thus, given the chance to avoid viewing a commercial, most viewers will do just that, even though many commercials are informative, entertaining, and relevant. Television viewers frequently walk away from commercials, fail to pay attention, or change channels.

Advertisers spend a lot of money to buy commercial time within shows, time-slots, and networks in order to target a particular type of audience, but these days they have little assurance that anyone is viewing their advertisements and virtually no feedback on what advertisements actually get viewed. Advertisers would benefit from a way to guarantee that advertising content is reaching its intended audience despite the fact that commercials are being skipped over at an ever-increasing rate. In addition, advertisers would benefit from having knowledge about the reach of advertising content.

A need exists for a method and system to reduce the annoyance factor of commercial viewing while ensuring that commercials are viewed instead of being skipped.

SUMMARY

The present invention provides an incentive for subscribers to view commercials/advertisements and a way to allow advertisers to target advertisements and track how their content is being viewed. Described herein is an advertising content storage and viewing management system that gives the viewers more control over their commercial viewing experience while providing the advertisers with a stronger guarantee of an audience for their advertising content. Service providers that run this system can benefit financially by charging subscribers and advertisers a fee for the service.

In accordance with one aspect of the invention, minimum requirements are placed on the advertisement viewing behaviors of subscribers. For example, commercials can be stored for viewing at a subscriber's machine, and if too many stored commercials have accumulated on a subscriber's system, then the subscriber's service could be curtailed until a number of commercials are viewed. The subscriber, therefore, needs to maintain a certain minimum level of advertisement viewing to maintain a given level of service.

According to another aspect of the invention, the system monitors whether a commercial is actually being viewed. This can be accomplished by requiring some sort of interaction by the viewer with the system every time a new commercial is displayed.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION

The present invention is directed to a method and system for managing the viewing of advertisements. In one embodiment, relevant advertisements are collected from broadcast channels, stored locally, and then enabled for viewing at a later time. Advertisements can be rated for relevance based on viewer profiles, and then only the relevant advertisements can be saved locally for later viewing by the subscriber. Viewer profiles can be based on viewing patterns of the viewer or based on the advertisements the viewer has selected in the past. Profiling based on program viewing behavior is known, but profiling based on selection of advertisements is unique to the system and method disclosed herein. In addition, the system and method allows viewers to manage when they view their advertising inventory. Such a system and method could be used in combination with existing systems in which broadcast content is rated for relevance to a particular viewership, and the most relevant content is stored locally for possible later paid viewing.

One difference between opt-in viewing of regular programming content and viewing of advertising content according to some aspects of the invention is that the viewing of advertising content can be required in some embodiments of the invention. Subscribers control when and how often they view commercials (to a point), but some minimum requirements are placed on these viewing behaviors. For example, if too many stored commercials have accumulated on a subscriber's system, then the subscriber's service could be curtailed until a certain number of commercials are viewed.

Another potential difference between the viewing of regular programming content and the viewing of advertising content according to some aspects of the invention is the ability to determine whether a commercial has been viewed while it is displayed. Advertisers prefer a guarantee that a commercial has actually been viewed while it was displayed. This can be accomplished by requiring some sort of interaction by the viewer with the system every time a new commercial is displayed. This could be as simple as a manual start and end to every commercial that is played. For example, a viewer might need to press <start> on a keypad to play a commercial before the commercial is played, and then the viewer might need to press <start> or <end> to view another commercial or end the viewing of commercials. In this manner, the advertisements that are viewed can be tracked and it can be assumed with reasonable confidence that the commercials are actually viewed.

As advertising content becomes more interactive, it will become easier to detect when a commercial is being viewed. These interactions and viewings by the subscriber can be logged locally, thus augmenting a profiling/targeting system locally. If a back-channel of communication exists, valuable viewing information can be provided to the advertiser.

1. Representative Network

Figure 1:
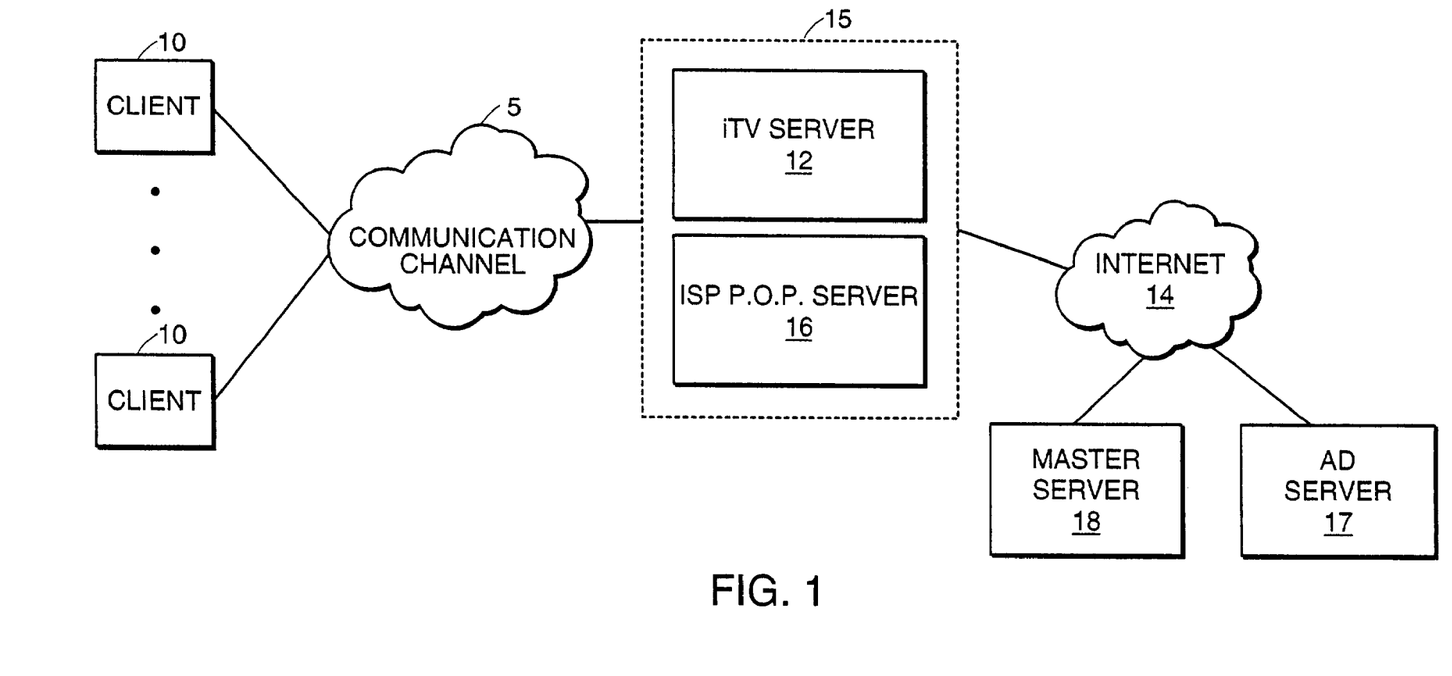
FIG. 1 is a schematic diagram illustrating a representative network in which the inventive system is preferably implemented.

FIG. 1 illustrates a representative network in which the inventive system can be implemented in one embodiment. The network includes one or more client machines 10 operated by various individual users. The client machines 10 connect to an iTV/ISP server 15 via a communication channel 5, which may be a broadcast that is relayed to the clients 10 via a cable connection, satellite dish, or the like. The communication channel 5, in some embodiments, includes a back-channel of communication for data going upstream from a client 10 to the iTV/ISP server 15. Such a back-channel of communication, also represented by communication channel 5 in FIG. 1, can be a telephone line or cable modem, and such a back-channel of communication allows two-way communication between the clients 10 and the iTV/ISP server 15. In another embodiment, which is a one-way communication embodiment, the iTV/ISP server 15 broadcasts information to the clients 10, but the clients 10 have no way of accessing or providing information back to the iTV/ISP server 15.

The iTV/ISP server 15 can be an iTV server 12, an ISP server 16, or a combination of the iTV server 12 and the ISP server 16. The iTV server 12 provides iTV content that can include programs, advertisements, and interactive content including the Internet. Such an iTV server can be provided by a cable operator, such as RCN. FIG. 1 also illustrates an ISP "point-of-presence" (POP), which includes an ISP POP Server 16, which can be linked to the client 10 for providing access to the Internet. The ISP server 16 can be operated by the same entity as the iTV server 12, by separate entities, or by a joint effort between entities. In addition, the iTV server 12 can also function as the ISP server 16. In any event, the combined iTV/ISP server 15 depicted in FIG. 1 represents the possibility that these two servers can be linked in some manner so that the client 10 has access to interactive television programming and the Internet. It should be noted, however, that in some embodiments a client 10 might not have Internet access, and in such cases the iTV server 12 can be used without an ISP server 16. The Internet service provided through the ISP server 16 can be provided through a cable modem or over telephone lines.

In some embodiments, advertising is hosted by an ad server 17 that is separate from the iTV server 12 that hosts the programming content. In such an embodiment, the iTV server 12 is connected to the ad server 17 by a communication channel 14, which can be an Internet connection. The ad server 17, which can exist in typical iTV or television networks, allows advertisers to interact with the iTV server 12 to manage advertising over the television. In one embodiment of the invention, a master server 18 is used to remotely manage the ad server 17. The master server 18 is connected to the ad server 14 through communication channel 14, which can be an Internet connection. The master server 18 can be used by advertisers in an embodiment of the invention to determine which ads should be sent to which clients 10. In addition, in a television embodiment, the master server 18 communicates this information to the ad server 17 through the communication channel 14, and the information is then forwarded to the iTV server 12 and ultimately the client 10. In an Internet embodiment, the master server 18 communicates this advertising information to the ISP server 16, which then communicates this information to the client 10. The master server 18 can also generate content recommendations for clients 10 that are relayed to the iTV server 12 via the ad server 17.

The client machine 10 can be an interactive television set with a set top box or, in other embodiments, a computer. Generally, these client machines 10 can be any type of network device existing for a subscriber. The set top box can be made by Motorola and the operating system may be the OpenTV operating system, although set top boxes made by other entities and other operating systems can also be used. The television itself can be made by any manufacturer, including but not limited to Magnavox, Sony, and Toshiba. A representative interactive television set includes a set top box with a computer processing unit and memory, a remote control or keyboard, and a display unit (television set). The screen of the display unit is used to present programs, advertising, and other content to the user. A graphical user interface (GUI) on the display unit can also be available for the user to make programming selections, interact with programs, and/or access the Internet. The GUI is supported by the operating system and allows the user to use a point and click method of input, e.g., by moving a highlighted area on the display screen to a section representing a program at a particular time and pressing on the remote control buttons to perform a selection. Also, one or more "windows" can be opened up on the screen independently or concurrently as desired. One predominant GUI is the interactive television guide that allows a user to select a program to watch through the use of a remote control unit. Client machines 10 usually access web servers through the connection provided by a cable company, such as RCN.

2. Collection, Rating, and Storage of Advertisements

Figure 2:
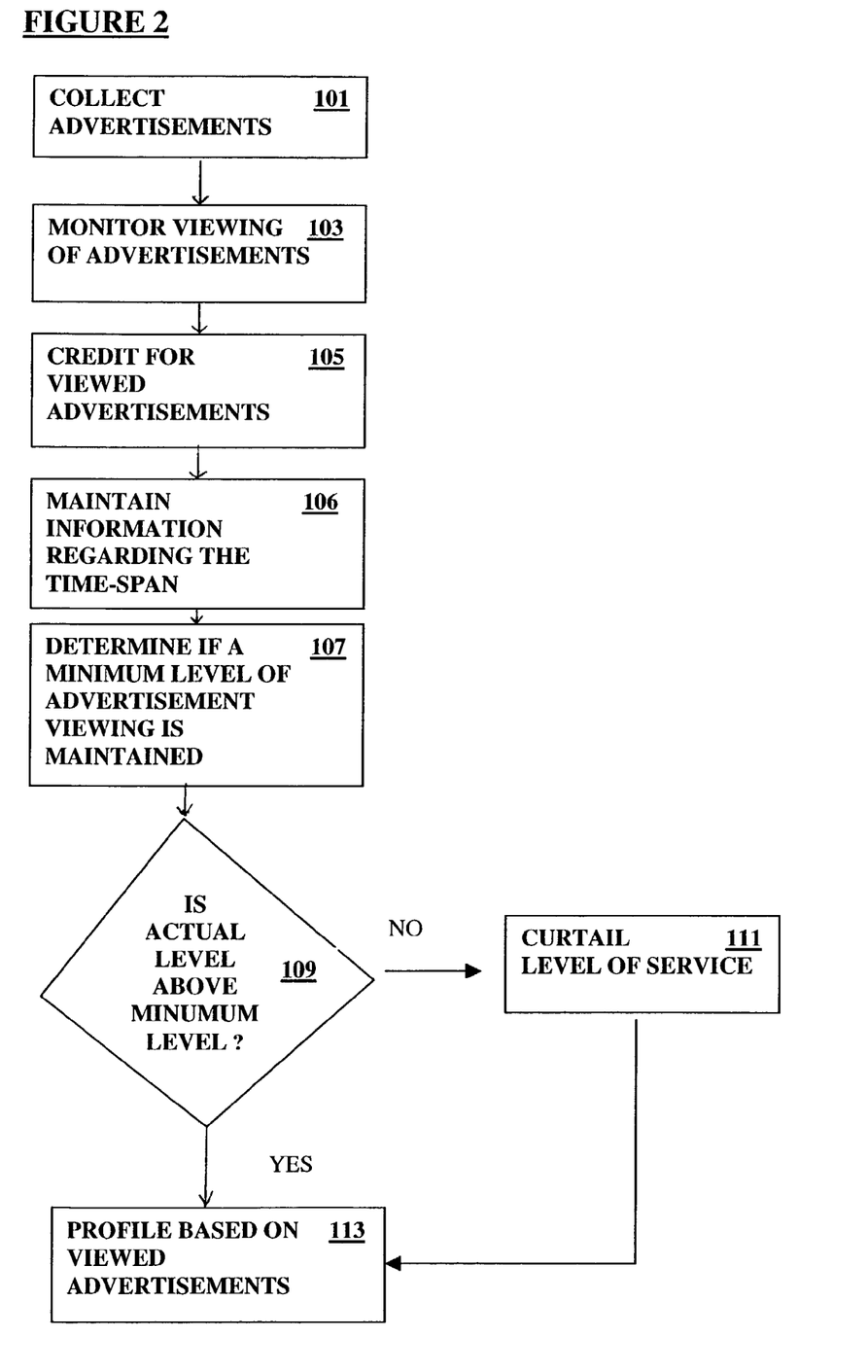
FIG. 2 is a flow chart illustrating in general the process for managing advertisements.

FIG. 2 is a flow chart illustrating the processes according to one aspect of the system for managing the viewing of advertisements. The advertisement management method and system can be divided into three primary categories: (1) collection, rating, and storage of advertisements; (2) management of viewing of advertisements; and (3) tracking of advertisement viewing for profiling the viewer/subscriber.

According to an aspect of the system and method of the invention, a cache of advertisements is collected, stored, and maintained for the subscriber. FIG. 2 depicts this act with block 101. Advertisements are collected from available broadcast channels, as well as any other available sources (e.g., advertisement server, networked PVRs, etc.). In some embodiments, a set-top box, which can be any terminal device that receives advertisements and content from a service provider, can be used at the client 10 level to cache advertisements.

In one embodiment, subscribers are able to keep a number of advertisements for multiple viewings on a storage space-available basis. In a networked environment, subscribers could also be allowed to surf for advertising content and to share stored advertisements with other subscribers.

Content information for advertisements, or information regarding the general nature of the advertisement, should be available to the system if profiling of the viewer and/or targeting of advertisements to the viewer is to be possible. If content information is unavailable for advertisements, then collection and storage of random advertisements is possible without targeting of the advertisements to the viewer within the scope of the invention.

As indicated above, in some embodiments advertisements can be targeted to the viewer based on the viewer's profile. A profile for the viewer/subscriber can be constructed using demographics of the viewer, the viewer's viewing patterns, or any other factors. Some methods for constructing the viewer's profile are discussed in greater detail below. In some embodiments, the viewer's profile can be used to target advertisements to the viewer so that advertisers can feel that particular advertisements are being viewed by a proper target audience. In one embodiment using targeted advertising, after advertisements are transmitted to the client 10 level, the set top box can store the advertisements according to the profile of the subscriber, which can also be locally stored on the client 10 level. In this manner, the most relevant advertisements are selected to maintain an optimal distribution over content affinities and demographics of the viewer, among other factors, within the cache. The advertisements that match most closely to the subscriber's profile, therefore, will be more likely to be viewed by the subscriber. In some embodiments, the cache of advertisements should contain a variety of types of relevant advertisements at all times.

3. Management of Viewing of Advertisements

According to an aspect of the invention, certain constraints are placed on the viewing of advertisements to ensure that advertisements are viewed within an acceptable time-frame, at an acceptable frequency, in acceptable numbers, and/or over an acceptable distribution. In order to accomplish this, the viewing of advertisements is monitored, as depicted in block 103 of FIG. 2, to ensure that a minimum level of advertisement viewing is maintained. Advertisements are monitored by keeping track of information about the number and/or types of advertisements viewed and the time-span over which those advertisements are viewed. FIG. 2 depicts with block 105 crediting the viewer with each advertisement viewed. In addition, FIG. 2 depicts with block 106 maintaining information regarding the time-span over which those advertisements are viewed. This time-span, for example, could be measured in days, weeks, or months, or, in other embodiments, in terms of the number of hours of programming content viewed.

As indicated above, viewing credit is given for confirmed advertisement viewings. This is accomplished by requiring the viewer to interact with the system when an advertisement is displayed. At a minimum, for example, the viewer can manually initiate display of the advertisement. For longer advertisements, it might be desirable to require the viewer to interact at the end of the display as well. For example, in order to receive credit for viewing an advertisement, a viewer might need to press <start> on a keypad (or click start with a mouse) to play a commercial before the commercial is played, and then the viewer might need to press <start> or <end> to view another commercial or end the viewing of commercials. For interactive advertisements, there are more possibilities for verification. In some embodiments, an advertisement can be paused, and interaction from the viewer can be required to continue the advertisement before programming content is displayed. In this embodiment, in order to receive credit for viewing an advertisement, a viewer might need to press <start> on a keypad to play a commercial before the commercial is played. The play of the advertisement could then pause part way through, and then the viewer might need to press <continue> or <start> to continue viewing of the advertisement and receive credit for viewing that advertisement.

If the viewer does not meet the minimum level of advertisement viewing, constraints can be placed upon the viewer's service. FIG. 2 depicts with block 107 an act of determining if a minimum level of advertisement viewing is maintained. In order to accomplish this in one embodiment, an actual level of advertisement viewing is compared with the minimum level of advertisement viewing required. FIG. 2 depicts this comparison with block 109. If the actual level of advertisement viewing does not meet the minimum level required, the viewer's service can be curtailed. FIG. 2 depicts an act of curtailing the viewer's level of service with block 111.

The constraints placed upon the viewer's level of service (or how the viewer's service is curtailed) will depend on the service tier elected by the subscriber as defined by the service provider, and to some extent by the advertiser (e.g., expiration dates for individual advertisements). In some embodiments, viewing behavior within these constraints is entirely at the viewer's discretion; if the viewer meets the minimum level of service required, the viewer can continue viewing programming content and advertisements without adverse consequences. If any viewing constraint is in danger of being violated, the system can intervene in various ways. In some embodiments, for instance, service can be curtailed until advertisements are viewed. The user's service level can be decreased, for instance, so that a more limited number of channels is provided to the user or so that certain popular channels are blocked. In other embodiments, in order to curtail the viewer's service, advertisements can be pushed for viewing so that the viewer is essentially forced to view advertisements instead of programming content. In this manner, some negative consequence or the threat of a negative consequence, such as a reduced level of service from a service provider, can be used to cause viewers to view advertisements. Numerous methods of curtailing the user's level of service can be used within the scope of the invention.

Advertisements can be deleted from the cache after the viewing requirements for the advertisements have been met, or they can be kept for further viewing on a storage space-available basis. Credit may or may not be given for multiple viewings of a single advertisement.

In some embodiments, a subscriber could pay a fee in order to enjoy a service level that allows him or her to control how and when to watch commercials. The subscriber can select among several tiers of service with varying amounts of required commercial viewing according to the fee. In one embodiment, for instance, a credit system could be used for commercials viewed, and this credit system would defray costs from a fixed fee. In another embodiment, credit for advertisement viewing could be rewarded with free products, services, or discounts.

Two examples of determining if a minimum level of advertisement viewing is maintained are provided below. These examples are exemplary only, and numerous other types of methods of determining if a minimum level of advertisement viewing is maintained can also be used within the scope of the invention.

a. EXAMPLE 1

As an example of the operation of the system in one embodiment, a minimum level of advertisement viewing could require the viewer to view 5 hours of advertisements for every 25 hours of programming content. In another embodiment, the minimum level of advertisement viewing could require the viewer to view 120 advertisements for every 5 hours of programming content. In this example, a counter for the number of advertisements actually viewed could start at 0, and a counter for the number of hours of programming content could also start at 0. The counter for the number of hours of programming content could increment with each minute of programming content viewed. Similarly, with each confirmed advertisement viewed, the counter for the number of advertisements actually viewed could increment. If the counter for the number of advertisements actually viewed does not reach 120 by the time the counter for the hours of programming content reaches 5 hours, the viewer's service level could be curtailed. Of course, in different embodiments, the ratio of advertisements required per hour of programming content could vary.

b. EXAMPLE 2

Numerous other implementations could also be used. In one embodiment, for example, the minimum level of advertisement viewing could require the viewer to view 750 advertisements every month, regardless of the amount of programming content viewed by the viewer. In such an embodiment, if the viewer is not on pace to meet the minimum level of advertisement viewing part way through the month, the set top box could deliver a warning message to the viewer. If, at the end of the month, the viewer had not viewed the required 750 advertisements, the viewer's service level could be curtailed.

4. Tracking Viewing of Advertisements and Profiling Subscribers

In some embodiments, some or all advertisement viewing events, and advertisement viewing behavior in general, can be tracked. This information can be used to enhance profiling of viewers and targeting of advertisements, and this information can be made available (for a fee) to advertisers if a backchannel of communication to the service provider exists. Interesting behavior such as repeat viewing of certain types of advertisements may enable inferences to be drawn regarding viewer characteristics. Viewed advertisements may be rated by the viewer, providing yet another source of information about viewer preferences.

a. Profiling Based on Program Viewing Behavior

There are many methods for profiling viewers based on their television program viewing behavior. Such profiling methods, for example, can use data generated by research programs about television programs to build profiles of viewers who watch those television programs. One suitable profiling method is described in Published U.S. Patent Application US20020059094A1, entitled "Method and System for Profiling iTV Users and for Providing Selective Content Delivery." In order to profile a viewer based on television viewing behavior, the set top box can receive data indicating interaction from the viewer. Typical viewer interactions include changing the channel, turning the client device on or off, viewing show information through the programming guide, or responding to interactive surveys, although other types of interactions can also be monitored. Such user-requested content information can be used to build a profile. The set top box can contain a component that extracts program data as it comes into the set top box in order to monitor the user, and such information may be stored in an interaction database on the set top box.

The profiler can then build a viewer profile based on the information in the interaction database and data in a local categorized program database. Viewer profile information may contain, but is not limited to, demographic data (such as, e.g., the user's age, gender, income, and highest attained education level), psychographic data, which reflects the user's interests or content affinity (such as, e.g., sports, movies, music, comedy), geographic data, and transactional data. In an embodiment using program data, the local categorized program database can contain demographic information on some or all of the television programs available from entities, such as AC Nielsen, that profile television programs using panels of viewers having known demographic characteristics. In other words, content-associated profile information for various programs may be available from a rating service. Program classification and profile data can be obtained from any third party vendors, such as but not limited to Neilsen NetRatings. In other embodiments, this data may be generated by the system of the invention after profiles are developed as described below. By adding a number of users of known demographics, the system could be configured to generate the program profile data. Furthermore, the overall demographics generated for the other anonymous users in the system could be used to fill out gaps in the program database, i.e., for programs having no classification data.

In some embodiments that profile the viewer based on program viewing behavior, the profiler can extract from the program database a set of demographic data associated with a particular television program request made by the viewer, which may be stored in the viewer interaction database. The profiler can also extract from the program database content affinity or psychographic data associated with a program request made by the viewer. Such content affinity and psychographic data may come from a categorized listing of television programs that translate a program identifier into content preferences. The information in the program database may be downloaded from the iTV server 12 to the set top box or client 10 periodically depending on the amount of memory available at the set top box.

Next, an existing user profile for the viewer can be accessed from a user profile database on the set top box. The demographic and content affinity data for the program request made by the user and the user profile are combined to create an updated inferred user profile using a hybrid averaging algorithm. One example of such an algorithm is an algorithm that provides a weighted average of the existing user profile data and the data gathered in the current Web browsing session. For example, the new user profile data equals the existing user profile data multiplied by the number of prior user sessions plus the new user profile data gathered in the current session, all divided by the sum of the number of prior sessions plus one. This is represented in the following equation:

new user profile=(existing user profile×number of prior sessions+new user profile)/(number of prior sessions+1).

If a user is new and no user profile exists, a profile may be created based on the zip code corresponding to the physical location of the client 10. Zip code data can also be used to supplement the demographic data supplied by a demographic information provider, such as AC Nielsen. The demographic data supplied by AC Nielsen may be based on the average demographics of people viewing a particular program.

For each viewing of a program having a stored profile, the program profile may be averaged or combined into the user's profile from the user profile database as previously discussed. In other embodiments, the user's profile is updated with program profile information when a program is viewed for a certain period of time, such as 20 minutes or more. The profiles include a rating in each category that reflects the interest in the category of persons who access the television program.

Each rating is accompanied by a confidence measure, which is an estimate of the accuracy of the rating. The confidence number is determined by analyzing the program and rating it on the type and specificity of content, with narrower and more singular content providing a higher confidence number. When the confidence measure in a particular category is below a predetermined threshold, information from other user profiles may be used to provide a more accurate rating in a process referred to as "profile completion."

An example of a user's profile is shown below. The first number in each category indicates the rating for that category. The ratings number is a percentage of a maximum rating, representing the degree of the user's affinity to the category. In the example below, the ratings number ranges from 0 to 100 with higher numbers indicating greater affinity. The second number in each category (in parenthesis) represents the confidence level in the rating for that category.

| User ID | Sports | Finance | Movies | Music | TV | ... | Health | Gardening |
|---|---|---|---|---|---|---|---|---|
| | | | | User Profile | | | | |
| 1 | 10.0 (.75) | 25.0 (.15) | 0.0 (1.00) | 0.0 (.28) | 0.0 (1.00) | ... | 50.0 (.77) | 85.0 (.82) |

Suppose the confidence threshold is defined to be 0.50 such that confidence is insufficient in any rating that has a confidence measure less than 0.50. For the user profile in the example table shown above, there is insufficient confidence in the ratings for the finance and music categories. In this situation, the system examines profiles of users with similar profiles to improve the accuracy of the ratings in those categories with low confidence measures.

In accordance with one embodiment of the invention, the system may selectively deliver content, e.g. program recommendations, or the like, to users based on the profiles inferred in the manner described above. A personalized agent, or matcher, may make recommendations of content, such as programs, to a user based on the user's profile and history or based on other users' profiles or histories. In one embodiment, the iTV server 12 broadcasts information to each of the clients 10 connected to that service, and the content, which may include programs, may be stored in the program database or in the local ad database. In general, the client 10 uses the profile stored in the profile database to filter out content being sent from the iTV server 12 and to recommend or retrieve content that appears to be suited to the user.

In one embodiment, the personalization agent can generate program recommendations based on the past viewing behavior of the user. In addition to program recommendations, an interactive program guide that may appear on the user's display when using iTV may be automatically rearranged so that the channels or programs that are most commonly watched by the user appear at the top of the guide.

The matcher component may then query the profiler or user profile database to get the user's profile. In addition, the matcher component may query the program database to ascertain which programs are currently showing or are showing in the near future. The matcher may then find the programs that best match the user's interests and return those programs as recommendations to the display screen. The program database may contain program information that is downloaded from the iTV server 12, as discussed above in connection with the profiler. Such program information may have associated demographic/psychographic information that may be used by the matcher to determine which programs best match the user's interests based on the user's profile.

b. Profiling Based on Advertisement Viewing

Typical profiling methods do not profile viewers based on their interactions with television advertisements. Until recently, there has not been a method for viewers to interact with television advertisements. Furthermore, unlike building viewer profiles based on programs viewed, there has not been convenient sources for data on advertisements akin to the data generated by Nielsen Media Research for television programs.

In order to build viewer profiles based on advertisement viewing, all commercials are categorized for advertiser, product, content, and related demographics as determined by industry research and the advertisers themselves. A profile of a viewer can then be created based on the types of commercials the viewer chooses to view, which commercials the viewer interacts with, and what products the viewer purchases through interaction processes on the television. The profile of the viewer based on advertisement viewing can therefore be constructed in a similar manner to that discussed above for profiling based on program viewing behavior. That is, if a viewer is allowed to choose which advertisements to view, information about those advertisements viewed can be used to construct the profile for that viewer. This profile for advertisements viewed can remain as a separate profile from a profile based on program viewing behavior, or, in other embodiments, the profiles can be combined into a single profile. In either case, incoming advertisements can be targeted to the viewer based on that viewer's profile. Advertisements could, for instance, be presented to the viewer in an order of relevance based on the viewer's profile.

5. Selection of Advertisements

After the advertisements have been collected and stored, there may be several mechanisms through which the viewer can access the stored advertisements. If a viewer wishes to manually access advertisements in order to view one or more advertisements and receive credit for viewing, the viewer can, in one embodiment, access a screen that displays all of the available advertisements in a mosaic display. The viewer can then use the arrow buttons on the remote control to navigate around the mosaic display and use the "select" button to play the desired advertisement. In this embodiment, all of the advertisements can be displayed in a size small enough to accommodate fitting all of the commercials on one screen. In cases where there are too many advertisements to fit on one screen in a reasonable space, the advertisements can be spread across multiple screens and at the bottom of each screen will be a "forwards" or "backwards" symbol that corresponds to the "forward" or "backward" buttons found on most remote controls. The viewer can move the highlight until it highlights either the "forward" or "backward" button. The viewer can then use the "select" button to get to the next screen of advertisements.

In some embodiments, the viewers can access the mosaic display through a button on the remote control, while in other embodiments it may only be accessible via a menu. In other embodiments, it may not be possible to display multiple advertisements on a screen. In those cases, the mosaic display can be replaced with a single advertisement on a screen and the viewer can scroll through the possible advertisements using the remote. The mosaic display can also be replaced by a simple list of all the advertisements consisting of text that gives a brief description of each advertisement.

The system described so far should be considered an example of a system for advertisement management based on current familiar technology. However, television systems will continue to evolve, and improvements in television systems can be used to enhance the performance of the system and method of the invention. Within the scope of the invention, an advertisement can be any item that can be stored, accessed, played, viewed, or run by the viewer in order to advertise for a product or service. Such advertisements can include but are not limited to interactive commercials and games that advertise for a product. In addition, references to viewing can include accessing, playing, visually viewing, listening to, or running an advertisement.

In some embodiments, standard real-time commercials will still be played during real-time television programming. These real-time commercials exist, in effect, in parallel with the system of stored advertisements. In order to reconcile the playing of real-time commercials within the system and method described herein, certain features can be included within the method and system.

In order to provide for the playing of a real-time advertisement, viewers can interact with the system to receive credit for that advertisement. As an example, a viewer could press a button that reads "Credit Me" and that appears halfway through the advertisement in order to receive credit for that advertisement.

Another possible method to reconcile the playing of real-time advertisements is to replace the real-time advertisement with one or more advertisements from the cache. If the duration of the real-time advertisement is known, it can be replaced with one or more advertisements from the cache and then displayed in order to provide the viewer with credit for a given advertisement.

The more time-shifted/recorded/VOD content that is viewed, the more powerful the advertisement management system becomes. For cases in which most or all viewed content is real-time programming, this system enables tracking of advertisement viewing and replacement of broadcast advertisements with targeted advertisements.

In some embodiments, the features described above amount to advertisement insertion combined with viewing management and targeting of advertisements.

Most functionality of this system can be client-based and has been presented as such. The functionality, for instance, can exist within a set-top box at the client 10 level shown in FIG. 1 rather than at the level of the service provider 15 level. However, with proper back-channel communication capacity, any or all functionality could be assumed by a server at the service provider 15 level. The need for local storage would be eliminated if sufficient bandwidth were available for content delivery from the server level.

Under one aspect of the invention, an advertiser pays the content or service provider to place advertising content into the system and to have access to subscriber viewing information. Fees for targeting of content would vary according to the degree of targeting. The advertiser benefits by gaining access to an audience whose potential reach is more guaranteed, more measurable, and more targeted.

Having described a number of embodiments of the present invention, it should be apparent that modifications can be made without departing from the spirit and scope of the invention. Accordingly, the drawings and above description are to be regarded as illustrative in nature and not in a restrictive or limiting sense, with the scope of the invention being indicated in the claims.

What is claimed is:

1. A method for managing television advertisements, the method comprising:
    tracking a minimum level of advertisement viewing at a client machine, the minimum level of advertisement viewing associated with a service level related to a number of channels available to a subscriber;
    providing a plurality of television advertisements for collecting and storing at the client machine;
    providing a user interface to allow a viewer to choose television advertisements from the plurality of television advertisements for viewing;
    allowing the viewer to manage when the viewer views television advertisements chosen from the plurality of television advertisements;
    crediting the subscriber each time one of the selected television advertisements is viewed using the client machine;
    determining if the minimum level of advertisement viewing is maintained by the subscriber by using the credited television advertisements; and
    curtailing the service level of the subscriber when the subscriber does not maintain the minimum level of advertisement viewing, wherein curtailing the service level includes reducing the number of channels available to the subscriber.

2. The method of claim 1, wherein the client machine for collecting and storing the plurality of advertisements is a set-top box.

3. The method of claim 1, wherein determining if a minimum level of advertisement viewing is maintained includes determining if advertisements are viewed at an acceptable frequency.

4. The method of claim 1, wherein determining if a minimum level of advertisement viewing is maintained includes determining if advertisements are viewed in acceptable overall numbers.

5. The method of claim 1, wherein determining if a minimum level of advertisement viewing is maintained includes determining if advertisements are viewed over an acceptable distribution of types of advertisements.

6. The method of claim 1, wherein the minimum level of advertisement viewing depends on a service tier elected by the viewer.

7. The method of claim 1, further comprising developing a profile of the viewer based on the advertisements selected by the viewer.

8. The method of claim 1, further comprising targeting the television advertisements to the viewer based on a profile of the viewer and content of the television advertisements.

9. The method of claim 8, further comprising rating the collected television advertisements for relevance based on the viewer's profile.

10. The method of claim 1, further comprising requiring interaction from the viewer when one of the television advertisements is viewed in order for the viewer to be credited for viewing one of the television advertisements.

11. The method of claim 10, wherein the interaction includes accepting start and stop instructions from the viewer.

12. The method of claim 10, wherein the interaction includes manually initiating the display of the advertisement.

13. The method of claim 1, wherein collecting a plurality of television advertisements includes collecting advertisements from one or more of a broadcast channel, an advertisement server, and a networked personal video recorder.

14. The method of claim 1, wherein curtailing the service level of the subscriber includes reducing the level of service of the subscriber until the subscriber reaches the minimum level of advertisement viewing.

15. The method of claim 1, wherein curtailing the service level of subscriber includes pushing advertisements to the viewer using the client machine.

16. A method for managing television advertisements, the method comprising:
 tracking a minimum level of advertisement viewing at a client machine, the minimum level of advertisement viewing associated with a service level being related to a number of channels available to a subscriber;
 providing a plurality of television advertisements for collecting, storing and maintaining at the client machine;
 providing a user interface to allow a viewer to choose television advertisements from the plurality of television advertisements for viewing;
 allowing the viewer to manage when the viewer views television advertisements chosen from the plurality of television advertisements;
 determining if the minimum level of advertisement viewing is maintained by the subscriber by using the tracking to monitor the viewing of the selected television advertisements is viewed using the client machine; and
 negatively impacting the service level of the subscriber when the subscriber does not maintain the minimum level of advertisement viewing wherein negatively impacting the service level of the subscriber includes reducing the number of channels available to the subscriber.

17. The method of claim 16, wherein collecting, storing, and maintaining a plurality of television advertisements at the client machine, includes sorting the television advertisements for relevance based on the viewer's profile.

18. A set-top box for an iTV, the set-top box comprising:
 a memory for storing a program; and
 a processor operative with the program to:
 track a minimum level of advertisement viewing at a client machine, the minimum level of advertisement viewing associated with a service level gein-g related to a number of channels available to a subscriber;
 collect for storing at the set-top box a plurality of television advertisements;
 provide a user interface to allow a viewer to choose television advertisements from the plurality of television advertisements for viewing;
 allow the viewer to manage when the viewer views television advertisements chosen from the plurality of television advertisements;
 credit the subscriber each time one of the television advertisements is viewed using the client machine;
 determine if the minimum level of advertisement viewing is maintained by the subscriber by using the credited television advertisements; and
 curtail the service level of the subscriber when the subscriber does not maintain the minimum level of advertisement viewing wherein curtailing the service level of the subscriber includes reducing the number of channels available to the subscriber.

19. A method for managing television advertisements, the method comprising:
 tracking a minimum level of advertisement viewing, the minimum level of advertisement viewing associated with a service level related to a number of channels available to a subscriber;
 collecting and for locally storing at the client machine a plurality of television advertisements;
 providing a user interface to allow a viewer to choose television advertisements from the plurality of television advertisements for viewing;
 allowing the viewer to manage when the viewer views television advertisements chosen from the plurality of television advertisements;
 crediting the subscriber each time one of the television advertisements is viewed using the client machine;
 determining if the minimum level of advertisement viewing is maintained by the subscriber by using the credited television advertisements;
 providing the subscriber with a discount for service if the subscriber maintains at least the minimum level of advertisement viewing; and
 curtailing the service level of the subscriber when the subscriber does not maintain the minimum level of advertisement viewing, wherein curtailing the service level includes reducing the number of channels available to the subscriber.

20. The method if claim 1, further including determining if advertisements are viewed within an acceptable time-frame.

21. A non-transitory computer-readable storage device having embedded therein a set of instructions which, when executed by one or more processors of said computer causes said computer to execute the operations for managing television advertisements, the operations comprising:
 using one or more computer processors and storage, tracking a minimum level of advertisement viewing, the minimum level of advertisement viewing associated with a service level related to a number of channels available to a subscriber;
 providing a plurality of television advertisements for collecting and storing;
 providing a user interface to allow a viewer to choose television advertisements from the plurality of television advertisements for viewing;
 allowing the viewer to manage when the viewer views television advertisements chosen from the plurality of television advertisements;
 crediting the subscriber each time the subscriber views one of the selected television advertisements;
 determining if the minimum level of advertisement viewing is maintained by the subscriber by using the credited television advertisements; and
 curtailing the service level of the subscriber when the subscriber does not maintain the minimum level of advertisement viewing, wherein curtailing the service level includes reducing the number of channels available to the subscriber.

22. A non-transitory computer-readable storage device having embedded therein a set of instructions which, when executed by one or more processors of said computer causes said computer to execute a method for managing television advertisements, the method comprising:
 using at least one computer processor and storage, tracking a minimum level of advertisement viewing, the minimum level of advertisement viewing associated with a service level related to a number of channels available to a subscriber;
 providing a plurality of television advertisements for collecting, storing and maintaining;
 providing a user interface to allow a viewer to choose television advertisements from the plurality of television advertisements for viewing;
 providing signals for allowing the viewer to manage when the viewer views television advertisements chosen from the plurality of television advertisements;

determining if the minimum level of advertisement viewing is maintained by the subscriber by using the tracking to monitor the viewing of the selected television advertisements is viewed using the client machine;

negatively impacting the service level of the subscriber when the subscriber does not maintain the minimum level of advertisement viewing wherein negatively impacting the service level includes reducing the number of channels available to the subscriber.

23. A non-transitory computer-readable storage device having embedded therein a set of instructions which, when executed by one or more processors of said computer causes said computer to execute a method for managing television advertisements, the method comprising:

tracking a minimum level of advertisement viewing, the minimum level of advertisement viewing associated with a service level being related to a number of channels available to a subscriber;

collecting and for locally storing at the client machine a plurality of television advertisements;

providing a user interface to allow a viewer to choose television advertisements from the plurality of television advertisements for viewing;

allowing the viewer to manage when the viewer views television advertisements chosen from the plurality of television advertisements;

crediting the subscriber each time one of the television advertisements is viewed using the client machine;

determining if the minimum level of advertisement viewing is maintained by the subscriber by using the credited television advertisements;

providing the subscriber with a discount for service if the subscriber maintains at least the minimum level of advertisement viewing; and curtailing the service level of the subscriber when the subscriber does not maintain the minimum level of advertisement viewing, wherein curtailing the service level includes reducing the number of channels available to the subscriber.

* * * * *